US010708432B2

(12) United States Patent
Kan et al.

(10) Patent No.: US 10,708,432 B2
(45) Date of Patent: *Jul. 7, 2020

(54) TECHNIQUES FOR CASE ALLOCATION

(71) Applicant: Afiniti Europe Technologies Limited, Cheshire (GB)

(72) Inventors: Itai Kan, McLean, VA (US); David J. Delellis, Doylestown, PA (US)

(73) Assignee: Afiniti Europe Technologies Limited, Cheshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/194,598

(22) Filed: Nov. 19, 2018

(65) Prior Publication Data

US 2019/0089836 A1 Mar. 21, 2019

Related U.S. Application Data

(63) Continuation of application No. 15/892,166, filed on Feb. 8, 2018, now Pat. No. 10,135,988, which is a (Continued)

(51) Int. Cl.
 *H04M 3/523* (2006.01)
 *G06Q 10/06* (2012.01)
(52) U.S. Cl.
 CPC .... *H04M 3/5233* (2013.01); *G06Q 10/06311* (2013.01); *H04M 2203/408* (2013.01)

(58) Field of Classification Search
 CPC .. G06Q 10/00; G06Q 10/06311; G06Q 17/60; G06Q 40/00; H04M 3/5158;
 (Continued)

(56) References Cited

U.S. PATENT DOCUMENTS 5,155,763 A 10/1992 Bigus et al.
5,206,903 A 4/1993 Kohler et al.
(Continued)

FOREIGN PATENT DOCUMENTS

AU 2008349500 C1 5/2014
AU 2009209317 B2 5/2014
(Continued)

OTHER PUBLICATIONS

Afiniti, "Afiniti® Enterprise Behavioral Pairing™ Improves Contact Center Performance," White Paper, retreived online from URL: <http://www.afiniti.com/wp-content/uploads/2016/04/Afiniti_White-Paper_Web-Email.pdf> 11 pages (2016).
(Continued)

*Primary Examiner* — Harry S Hong
(74) *Attorney, Agent, or Firm* — Wilmer Cutler Pickering Hale and Dorr LLP

(57) ABSTRACT

Techniques for case allocation are disclosed. In one particular embodiment, the techniques may be realized as a method for case allocation comprising receiving, by at least one computer processor, at least one case allocation allocated using a first pairing strategy, and then reassigning, by the at least one computer processor, the at least one case allocation using behavioral pairing.

21 Claims, 5 Drawing Sheets

Collaborative Allocation Method 200

Related U.S. Application Data continuation of application No. 15/364,699, filed on Nov. 30, 2016, now Pat. No. 9,924,041.

(60) Provisional application No. 62/261,780, filed on Dec. 1, 2015.

(58) Field of Classification Search
CPC ............ H04M 3/5175; H04M 3/5183; H04M 3/5232; H04M 3/5233; H04M 3/5235; H04M 3/5236; H04M 3/5238; H04M 2203/408
See application file for complete search history.

(56) References Cited

U.S. PATENT DOCUMENTS

| | | |
|---|---|---|
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,535,600 B1 | 3/2003 | Fisher et al. |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,207 B1 | 9/2014 | Agarwal |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| 9,924,041 B2 * | 3/2018 | Kan ................... H04M 3/5233 |
| 10,135,988 B2 * | 11/2018 | Kan ................... H04M 3/5233 |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |

(56) References Cited

U.S. PATENT DOCUMENTS

| | | |
|---|---|---|
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0153996 A1 | 7/2007 | Hansen |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0086402 A1 | 3/2014 | Kan et al. |
| 2014/0119531 A1 | 5/2014 | Tuchman et al. |
| 2014/0119533 A1 | 5/2014 | Spottiswoode et al. |
| 2014/0341370 A1 | 11/2014 | Li et al. |
| 2015/0055772 A1 | 2/2015 | Klemm et al. |
| 2015/0281448 A1 | 10/2015 | Putra et al. |
| 2016/0080573 A1 | 3/2016 | Chishti |
| 2016/0196524 A1 | 7/2016 | Ito |
| 2017/0064080 A1 | 3/2017 | Chishti et al. |
| 2017/0064081 A1 | 3/2017 | Chishti et al. |
| 2017/0155769 A1* | 6/2017 | Kan ............. H04M 3/5233 |
| 2018/0167513 A1* | 6/2018 | Kan ............. H04M 3/5233 |

FOREIGN PATENT DOCUMENTS

| | | |
|---|---|---|
| AU | 2009311534 B2 | 8/2014 |
| AU | 2015203175 A1 | 7/2015 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| EP | 1335572 A2 | 8/2003 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-507420 A | 6/2000 |
| JP | 2000-236393 A | 8/2000 |
| JP | 2000-253154 A | 9/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2009-081627 A | 4/2009 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |

(56) References Cited

FOREIGN PATENT DOCUMENTS

| PH | 1-2010-501704 | | 2/2014 |
|---|---|---|---|
| PH | 1-2010-501705 | | 2/2015 |
| WO | WO-1999/017517 | A1 | 4/1999 |
| WO | WO-2001/063894 | A2 | 8/2001 |
| WO | WO-2006/124113 | A2 | 11/2006 |
| WO | WO-2009/097018 | A1 | 8/2009 |
| WO | WO-2010/053701 | A2 | 5/2010 |
| WO | WO-2011/081514 | A1 | 7/2011 |
| WO | WO-2015/019806 | A1 | 2/2015 |

OTHER PUBLICATIONS

Anonymous. (2006) "Performance Based Routing in Profit Call Centers," The Decision Makers' Direct, located at www.decisioncraft. com, Issue Jun. 2002 (3 pages).
Canadian Office Action issued in Canadian Patent Application No. 2713526, dated Oct. 25, 2016, 7 pages.
Cleveland, William S., "Robust Locally Weighted Regression and Smoothing Scatterplots," Journal of the American Statistical Association, vol. 74, No. 368, pp. 829-836 (Dec. 1979).
Cormen, T. H., et al., "Introduction to Algorithms," 3rd Edition, Chapter 26 Maximum Flow, pp. 708-768 and Chapter 29 Linear Programming, pp. 843-897 (2009).
Extended European Search Report issued by the European Patent Office for European Application No. 17154781.3 dated May 4, 2017 (7 pages).
Extended European Search Report issued by the European Patent Office for European Application No. 17171761.4 dated Aug. 30, 2017 (8 pages).
Extended European Search Report issued by the European Patent Office for European Application No. 18168620.5 dated Jun. 12, 2018 (9 pages).
Gans, N. et al. (2003), "Telephone Call Centers: Tutorial, Review and Research Prospects," Manufacturing & Service Operations Management, vol. 5, No. 2, pp. 79-141.
International Preliminary Report on Patentability issued in connection with PCT Application No. PCT/US2009/066254 dated Jun. 14, 2011 (6 pages).
International Search Report and Written Opinion issued by the European Patent Office as International Searching Authority for International Application No. PCT/IB2016/001762 dated Feb. 20, 2017 (15 pages).
International Search Report and Written Opinion issued by the European Patent Office as International Searching Authority for International Application No. PCT/IB2016/001776 dated Mar. 3, 2017 (16 pages).
International Search Report and Written Opinion issued by the European Patent Office as International Searching Authority for International Application No. PCT/IB2016/001871 dated Mar. 17, 2017 (13 pages).
International Search Report and Written Opinion issued by the European Patent Office as International Searching Authority for International Application No. PCT/IB2017/000570 dated Jun. 30, 2017 (13 pages).
International Search Report issued in connection with International Application No. PCT/US13/33268 dated May 31, 2013 (2 pages).
International Search Report issued in connection with PCT Application No. PCT/US/2009/054352 dated Mar. 12, 2010, 5 pages.
International Search Report issued in connection with PCT Application No. PCT/US2008/077042 dated Mar. 13, 2009 (3 pages).
International Search Report issued in connection with PCT Application No. PCT/US2009/031611 dated Jun. 3, 2009 (5 pages).
International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).

International Search Report issued in connection with PCT/US2013/033261 dated Jun. 14, 2013 (3 pages).
International Search Report issued in connection with PCT/US2013/33265 dated Jul. 9, 2013 (2 pages).
Japanese Office Action issued by the Japan Patent Office for Application No. 2015-503396 dated Jun. 29, 2016 (7 pages).
Japanese Office Action issued by the Japanese Patent Office for Japanese Application No. 2016-159338 dated Oct. 11, 2017 (12 pages).
Japanese Office Action issued by the Japanese Patent Office for Japanese Application No. 2016-189126 dated Oct. 19, 2017 (24 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Nocedal, J. and Wright, S. J., "Numerical Optimization," Chapter 16 Quadratic Programming, pp. 448-496 (2006).
Notice of Reasons for Rejection issued by the Japan Patent Office for Japanese Application No. 2018-528305 dated Oct. 17, 2018 (6 pages).
Notice of Reasons for Rejection issued by the Japan Patent Office for Japanese Application No. 2018-528314 dated Oct. 17, 2018 (5 pages).
Ntzoufras, "Bayesian Modeling Using Winbugs". Wiley Interscience, Chapter 5, Normal Regression Models, Oct. 18, 2007, pp. 155-220 (67 pages).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Subsequent Substantive Examination Report ssued in connection with Philippines Application No. 1-2010-501705 dated Jul. 14, 2014 (1 page).
Substantive Examination Report issued in connection with Philippines Application No. 1/2011/500868 dated May 2, 2014 (1 page).
Written Opinion of the International Searching Aurhority issued in connection with PCT Application No. PCT/US2008/077042 dated Mar. 13, 2009, 6 pages.
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 24, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.

* cited by examiner

Case Splits
300

| Agent | Case 1 | Case 2 | Case 3 | Case 4 | Case 5 | Case 6 | Case 7 | Case 8 | Case 9 |
|---|---|---|---|---|---|---|---|---|---|
| 1 | O | J | E | M | M | J | M | E | J |
| 2 | O | M | J | M | J | M | E | J | M |
| 3 | O | J | E | J | M | M | E | E | M |
| 4 | O | M | M | E | M | J | J | J | M |
| 5 | E | M | M | E | E | J | M | J | J |
| 6 | O | O | O | J | J | E | M | M | E |
| 7 | O | O | M | J | J | M | E | J | M |

| Ongoing | Excluded | Management | Joint |
|---|---|---|---|
| O | E | M | J |

FIG. 3

TECHNIQUES FOR CASE ALLOCATION

CROSS-REFERENCE TO RELATED APPLICATIONS

This patent application is a continuation patent application of U.S. patent application Ser. No. 15/892,166 filed Feb. 8, 2018 (now U.S. Pat. No. 10,135,988); which is a continuation of U.S. patent application Ser. No. 15/364,699, filed Nov. 30, 2016 (now U.S. Pat. No. 9,924,041); which claims priority to U.S. Provisional Patent Application No. 62/261,780, filed Dec. 1, 2015, each of which is hereby incorporated by reference in its entirety as if fully set forth herein.

FIELD OF THE DISCLOSURE

This disclosure generally relates to customer service/contact center case assignment, more particularly, to techniques for collaborative and non-collaborative allocations of cases to agents using behavioral pairing.

BACKGROUND OF THE DISCLOSURE

In some customer service centers, cases may be assigned to agents (e.g., analysts, specialists) for servicing. For example, insurance claims may be assigned to insurance adjusters or other agents for subrogation or other processing; patients or other insureds may be assigned to nurses, pharmacists, or other clinical support specialists; debt collectors may be assigned to debtor cases; and so on. These cases may be assigned in a variety of ways. In some customer service centers (including, for example, workflow, case management, or transaction processing service or support organizations), cases may be assigned to agents based on time of arrival. This strategy may be referred to as a "first-in, first-out", "FIFO", or "round-robin" strategy. In some customer service centers, management (e.g., managers or supervisors) may assign cases to agents (including other types of specialists such as those mentioned above), possibly with a particular rationale based on information known to the management, such as information about an agent's skills or historical performance. For some cases, management may have low confidence in their assignments or lack relevant information to make optimal assignments.

Also, in some customer contact centers, cases or contacts may be assigned to agents for servicing. For example, a "lead list" of contacts may be generated for each agent to contact (e.g., using an outbound dialer). These contacts may be assigned to agents using a FIFO strategy. In other environments, contacts may be assigned to agents using other methods such as management-based assignments.

In view of the foregoing, it may be understood that there may be significant problems and shortcomings associated with current FIFO or management-assigned strategies.

SUMMARY OF THE DISCLOSURE

Techniques for case allocation are disclosed. In one particular embodiment, the techniques may be realized as a method for case allocation comprising receiving, by at least one computer processor, at least one case allocation allocated using a first pairing strategy, and then reassigning, by the at least one computer processor, the at least one case allocation using behavioral pairing.

In accordance with other aspects of this particular embodiment, the first pairing strategy is assigned by management.

In accordance with other aspects of this particular embodiment, the first pairing strategy is a first-in, first-out (FIFO) pairing strategy.

In accordance with other aspects of this particular embodiment, a subsequent reassignment of the at least one case allocation using the first pairing strategy may be received by the at least one computer processor.

In accordance with other aspects of this particular embodiment, a subsequent reversion of the at least one case allocation using the first pairing strategy may be received by the at least one computer processor.

In accordance with other aspects of this particular embodiment, a plurality of case allocations allocated using the first pairing strategy is received by the at least one computer processor, the plurality of case allocations may be split by the at least one computer processor into at least a first portion of cases and a second portion of cases, and the second portion of case allocations may be reassigned by the at least one computer processor using behavioral pairing without reassigning the first portion of case allocations.

In accordance with other aspects of this particular embodiment, a difference in performance between the first portion of case allocations and the second portion of case allocations may be determined by the at least one computer processor.

In accordance with other aspects of this particular embodiment, splitting the plurality of cases is based in part on at least one rationale from management for at least one of the plurality of case allocations.

In accordance with other aspects of this particular embodiment, splitting the plurality of cases is based in part on at least one confidence level from management for at least one of the plurality of case allocations.

In another particular embodiment, the techniques may be realized as a system for case allocation comprising at least one computer processor configured to receive at least one case allocation allocated using a first pairing strategy, and then reassign the at least one case allocation using behavioral pairing. The system may also comprise at least one memory, coupled to the at least one computer processor, configured to provide the at least one computer processor with instructions.

In another particular embodiment, the techniques may be realized as an article of manufacture for case allocation comprising at least one non-transitory computer processor readable medium and instructions stored on the at least one medium, wherein the instructions are configured to be readable from the at least one medium by at least one computer processor and thereby cause the at least one computer processor to operate so as to receive at least one case allocation allocated using a first pairing strategy and then reassign the at least one case allocation using behavioral pairing.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 3 shows a schematic representation of case splits according to embodiments of the present disclosure.

DETAILED DESCRIPTION

Figure 1:
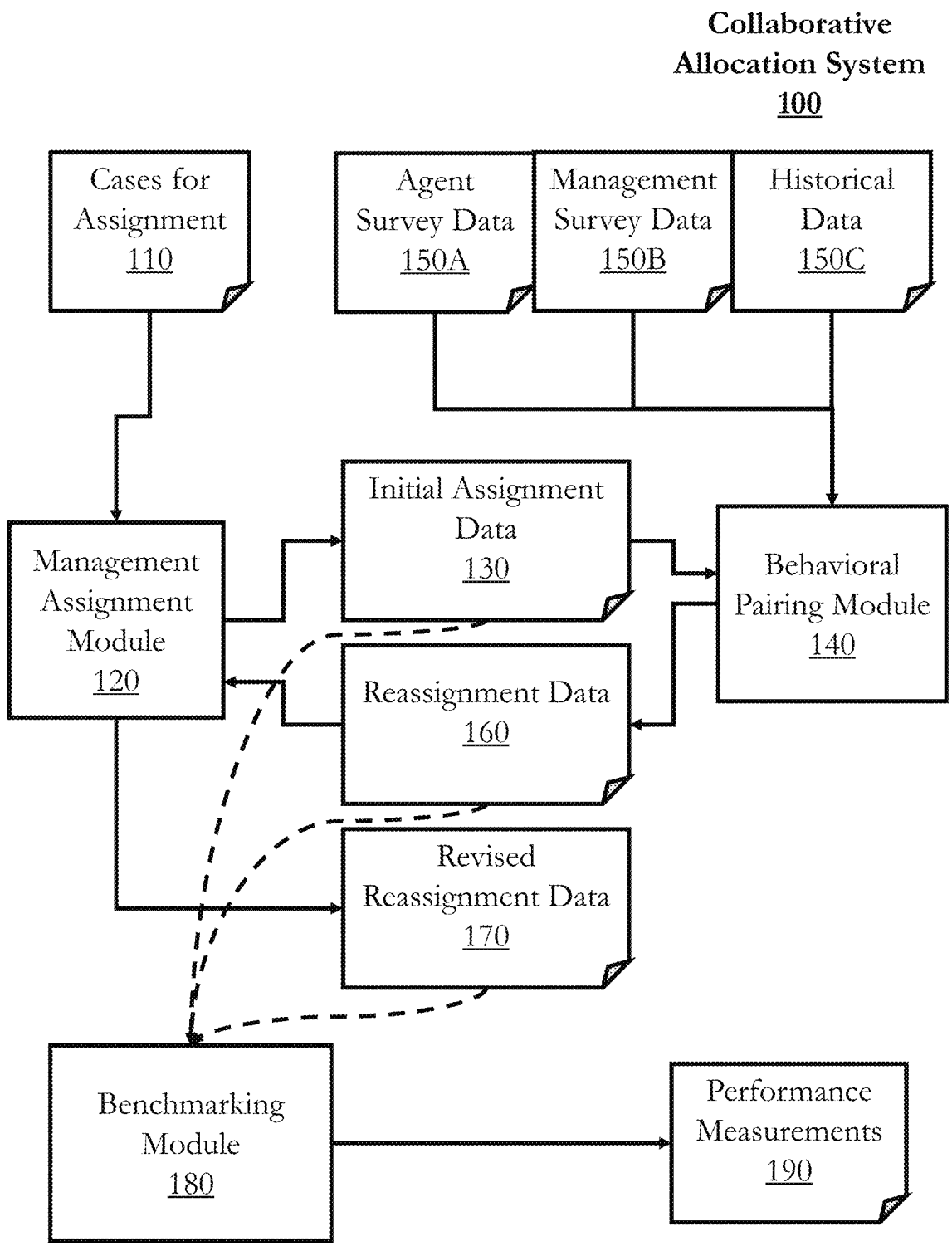
FIG. 1 shows a flow diagram of a collaborative allocation system according to embodiments of the present disclosure.

In some customer service centers, cases may be assigned to agents (e.g., analysts, specialists) for servicing. For example, insurance claims may be assigned to insurance adjusters or other agents for subrogation or other processing; patients or other insureds may be assigned to nurses, pharmacists, or other clinical support specialists; debt collectors may be assigned to debtor cases; and so on. These cases may be assigned in a variety of ways. In some customer service centers (including, for example, workflow, case management, or transaction processing service or support organizations), cases may be assigned to agents based on time of arrival. This strategy may be referred to as a "first-in, first-out", "FIFO", or "round-robin" strategy. In some customer service centers, management (e.g., managers or supervisors) may assign cases to agents (including other types of specialists such as those mentioned above), possibly with a particular rationale based on information known to the management, such as information about an agent's skills or historical performance. For some cases, management may have low confidence in their assignments or lack relevant information to make optimal assignments.

Also, in some customer contact centers, cases or contacts may be assigned to agents for servicing. For example, a "lead list" of contacts may be generated for each agent to contact (e.g., using an outbound dialer). These contacts may be assigned to agents using a FIFO strategy. In other environments, contacts may be assigned to agents using other methods such as management-based assignments.

In some embodiments, management assignments may be collaboratively enhanced using an automated case assignment system, such as a behavioral pairing module as described in U.S. patent Ser. No. 14/871,658, filed Sep. 30, 2015, now U.S. Pat. No. 9,300,802, issued Mar. 29, 2016, and incorporated by reference herein. In this way, a collaborative allocation system may leverage a big data, artificial intelligence pairing solution (e.g., the behavioral pairing module) with management expertise (e.g., a management assignment module) to optimize case assignment, resulting in increased performance in a customer service center. For example, collaborative allocation or other uses of behavioral pairing of cases may result in increased subrogation recoveries for insurance claims, improved care for medical patients, improved debt collection, and so on. In other embodiments, behavioral pairing and management-based pairing may be performed separately in a non-collaborative fashion.

In some embodiments, behavioral pairing may be performed "offline" (e.g., not in real time) to assign cases, generate lead lists, or perform other types of contact assignments using collaborative or non-collaborative techniques.

Additionally, the improved performance of collaboratively-allocated cases or non-collaboratively allocated cases as compared to management-allocated cases may be precisely measurable as a gain (e.g., 1%, 3%, 5%, etc.). In some embodiments, gain may be precisely measured using a benchmarking module as described in U.S. patent application Ser. No. 15/131,915, filed Apr. 18, 2016.

FIG. 1 depicts the workflow of a collaborative allocation system 100 according to some embodiments of the present disclosure.

Cases for assignment 110 may be received by, e.g., a management assignment module 120 at a customer service center. The management assignment module 120 may be provided solely by the customer service center (including other types of customer service centers and aforementioned support organizations), or it may be provided in whole or in part as a component of a collaborative allocation system.

The management assignment module 120 may output initial assignment data 130. Initial assignment data 130 may include pairings of cases with agents (including other types of agents and aforementioned specialists), and it may include management rationale for these pairings. For example, each pairing may have an associated score representing management's confidence (e.g., certainty) in a particular pairing. In some embodiments, each pairing may have one or more associated reason codes or other codes indicating management's reasons for a particular pairing (e.g., a good fit with agent's skills or personality given information about the agent known to management). Pairings may include an expected level of time or effort (e.g., intensity) required to resolve the case. Pairings may also take into account balancing caseload across agents including agents' capacities to take on additional cases with varying requirements for time or effort.

The initial assignment data 130 may be analyzed by a behavioral pairing module 140 (or similar pairing engine). At this point, some cases will be excluded (i.e., reserved or frozen) by management. For example, if management has expressed high confidence or a particular reason code for a case, or if the behavioral pairing module 140 has determined low ability improve the initial assignment, the behavioral pairing module 140 will not consider this case for reassignment.

The remaining cases may be split into cases that may be reassigned (e.g., an optimized or "on" group) and cases that may not be reassigned (e.g., a control or "off" group). This split may be done according to any of many possible splitting strategies. For example, management may provide a seed to a pseudorandom number generator, which may be used to randomly distributed cases into one group or the other. In some embodiments, cases will be divided evenly between the groups. In other embodiments, an uneven distribution of cases may be used. For example, 80% of the cases available for reassignment may be split into the optimized group, while 20% of the cases available for reassignment may be split into the control group. The technique used for splitting cases between the groups may be designed to ensure transparency and fairness when benchmarking performance.

Following the splitting of the cases, the cases in the optimized group may be reassigned by the behavioral pairing module 140 or similar automatic pairing techniques. In some embodiments, the behavioral pairing module 140 may incorporate data about the agents and the management (e.g., agent survey data 150A, management survey data 150B, historical data 150C). The survey may include self-assessment questions (e.g., which types of cases are you most skilled at? Which types of cases do you prefer to handle? Which stage of a case are you most skilled at? Which stage of a case do you prefer to handle?). For management, survey questions may be directed at understanding a manager's rationale for assigning particular types of cases or cases at particular stages to particular agents. Historical data may include information such as historical case assignments and outcomes, case "scores" or other case assessments prior to assignment, and other baseline performance measurements. The behavioral pairing module 140 may also search/analyze/process other data sources for information that may be relevant to optimizing assignments and creating artificial intelligence models. The behavioral pairing module 140 may account for any stage of the case management process to optimize case assignments, such as workflow, case management, transaction processing, etc.

The behavioral pairing module 140 may output reassignment data 160, which may include pairings from the optimized group that have been reassigned to different agents. In some embodiments, the reassignment data 160 may be reviewed by the management assignment module 120, and the management assignment module 120 may optionally output revised reassignment data 170. For example, the revised reassignment data 170 may optionally "undo", revert, or otherwise change some of the reassigned pairings based, for example, on information known to management.

Subsequently, the benchmarking module 180 may measure the gain in performance attributable to the collaboration between management and the behavioral pairing module 140. The benchmarking module 180 may process the outcomes of each pairing to determine the relative performance of cases in the optimized or "on" group, which were collaborative allocated, against the performance of cases in the control or "off" group, which were allocated solely by management. The benchmarking module 180 may output performance measurements 190 (e.g., gain) or other information regarding the performance of the collaborative allocation system 100.

The collaborative allocation system 100 may repeat this process as new cases for assignment (e.g., cases for assignment 110) arrive or otherwise become ready to be allocated among the agents. In some embodiments, the management assignment module 120 or the behavioral pairing module may process results from earlier iterations to improve the management process (e.g., train managers regarding certain rationales that were more or less effective than others) or the behavioral pairing process (e.g., train or update the artificial intelligence algorithms or models).

In some embodiments, the collaborative allocation system 100 may operate "online" (e.g., in real time) as cases arrive at a queue or as management assignments are made. In other embodiments, the collaborative allocation system 100 may operate "offline" (e.g., not in real time), so that a group of cases may be reassigned or otherwise allocated together.

Figure 2:
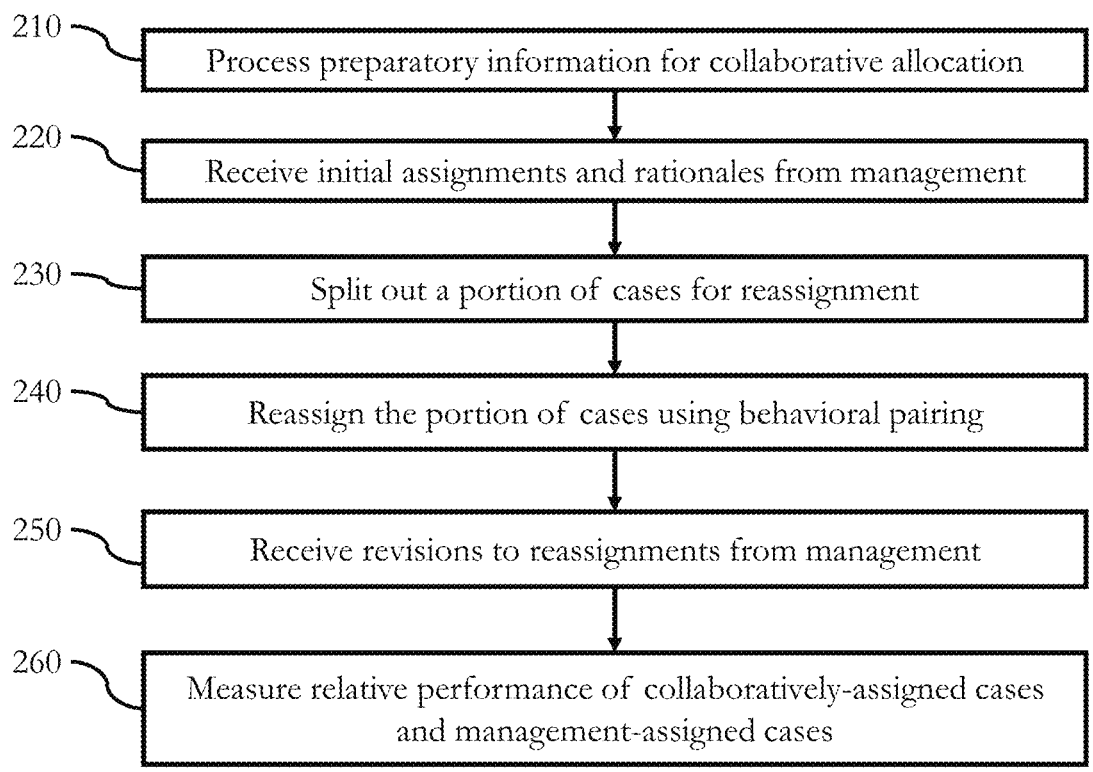
FIG. 2 shows a flow diagram of a collaborative allocation method according to embodiments of the present disclosure.

FIG. 2 shows a flowchart of a collaborative allocation method 200 according to embodiments of the present disclosure. At block 210, collaborative allocation method 200 may begin.

At block 210, preparatory information for collaborative allocation may be processed. For example, an assignment or pairing module (e.g., behavioral pairing module 140) may receive agent survey data, management survey data, historical data, or other information for processing in preparation for reassigning or otherwise allocating cases to agents. Collaborative allocation method 200 may proceed to block 220.

At block 220, initial assignment data (e.g., initial management assignment data) may be received. In some embodiments, rationales for management assignments may also be received. Collaborative allocation method 200 may proceed to block 230.

At block 230, a portion of cases may be split out for reassignment, while another portion of cases may be excluded (reserved, frozen, or otherwise held back) from potential reassignment. In some embodiments, these cases may also be excluded from benchmarking measurements. Collaborative allocation method 200 may proceed to block 240.

At block 240, the portion of cases split out for reassignment may be reassigned. In some embodiments, reassignment may be performed by a pairing module such as behavioral pairing module 140. In some embodiments, reassignment data may be output or otherwise returned for management review or further assignment. In some embodiments, a portion of the cases split out for reassignment may be designated to a control group and will not be reassigned. Collaborative allocation method 200 may proceed to block 250.

At block 250, revisions to reassignments, if any, may be received. In some embodiments, management may revise, revert, or otherwise change the reassignments that were carried out by the pairing module at block 240. Revised or reverted cases may be included or excluded from benchmarking measurements. Collaborative allocation method 200 may proceed to block 260.

At block 260, the relative performance of collaboratively-assigned cases and management-assigned cases may be benchmarked or otherwise measured. In some embodiments, results from the comparison may be used to improve the pairing module (e.g., artificial intelligence models of behavioral pairing module 140) or the rationales of management for subsequent management assignments, or both.

Following block 260, collaborative allocation method 200 may end. In some embodiments, collaborative allocation method 200 may return to block 210 to begin allocating additional cases.

FIG. 3 depicts a schematic representation of case splits according to embodiments of the present disclosure. As shown in FIG. 3, seven agents may be assigned up to nine cases. Some cases may be designated as "Ongoing" (e.g., cases that were previously assigned but not yet complete). "Excluded" (i.e., frozen or held back) cases are cases assigned to an agent that were determined to not be made available for reassignment. "Management" cases are cases assigned to an agent that were made available for reassignment but were allocated to the control group. "Joint" cases are cases allocated to the optimized group, which were jointly/collaboratively reassigned and/or revised by management.

In the example of FIG. 3, seven agents (labeled 1 to 7 in the "Agent" column) have a docket or queue of nine cases (labeled "Case 1" to "Case 9" in the header row). Agent 1's first case ("Case 1") is identified by an "O" for Ongoing, and cases 2-9 have been split for assignment or collaborative allocation: Cases 3 and 8 ("E") have been excluded from collaborative allocation, and may optionally be excluded from any benchmarking or relative performance analysis. Cases 4, 5, and 7 ("M") have been assigned by management, and may be benchmarked as being part of the control or off cycle. Cases 2, 6, and 9 ("J") have been allocated by an automated pairing strategy such as behavioral pairing, and may be benchmarked as being part of the optimized or on cycle. In the case of collaborative allocation, the optimized pairings may be made jointly with management. In other embodiments, such as non-collaborative allocation, the optimized pairings may be made independently by the pairing strategy such as behavioral pairing, without revision or reassignment by management. The remaining agents Agent 2 to Agent 7 have been assigned or reassigned up to nine available cases in a similar manner. As agents close cases in their dockets or queues, and as more cases become available for assignment, these new cases may be split for assignment or reassignment among the available agents according to the collaborative or non-collaborative allocation techniques in use for this set of agents.

The outcome of each case may be associated with whether a case was ongoing, excluded, management-assigned, or jointly-assigned using a pairing strategy such as behavioral pairing. The relative performance of different assignment methodologies may be benchmarked or otherwise measured. For example, the performance gain attributable to jointly-assigned cases using behavioral pairing over management-assigned cases may be benchmarked.

Figure 4:
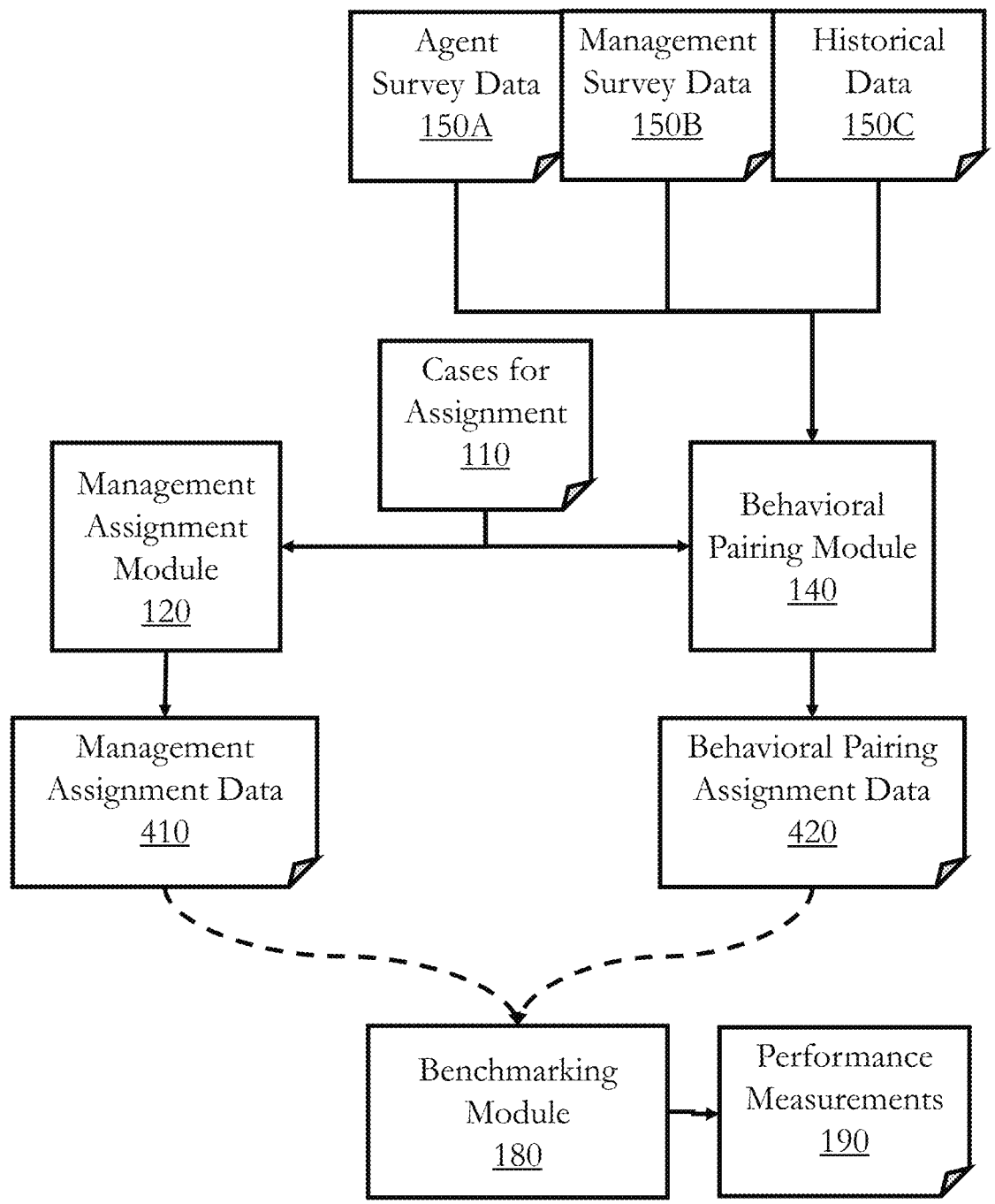
FIG. 4 shows a flow diagram of a non-collaborative allocation system according to embodiments of the present disclosure.

FIG. 4 depicts the workflow of a non-collaborative allocation system 400 according to some embodiments of the present disclosure.

Cases for assignment 110 may be received at a contact center. The cases may be split into two or more groups for assignment by different strategies. In some embodiments, a portion of cases may be assigned randomly, on a FIFO basis, by management, or other case allocation techniques. A second portion of cases may be assigned using a pairing strategy such as behavioral pairing. In some embodiments, as in the example of FIG. 4, a first portion of cases may be received by management assignment module 120, and a second portion of cases may be received by behavioral pairing module 140.

The management assignment module 120 may output management assignment data 410. Management assignment data 410 may include pairings of cases with agents, and it may include management rationale for these pairings. For example, each pairing may have an associated score representing management's confidence (e.g., certainty) in a particular pairing. In some embodiments, each pairing may have one or more associated reason codes or other codes indicating management's reasons for a particular pairing (e.g., a good fit with agent's skills or personality given information about the agent known to management). Pairings may include an expected level of time or effort (e.g., intensity) required to resolve the case. Pairings may also take into account balancing caseload across agents including agents' capacities to take on additional cases with varying requirements for time or effort.

The behavioral pairing module 140 may output behavioral pairing assignment data 420. In some embodiments, the behavioral pairing module 140 may incorporate data about the agents and the management (e.g., agent survey data 150A, management survey data 150B, historical data 150C). The survey may include self-assessment questions (e.g., which types of cases are you most skilled at? Which types of cases do you prefer to handle? Which stage of a case are you most skilled at? Which stage of a case do you prefer to handle?). For management, survey questions may be directed at understanding a manager's rationale for assigning particular types of cases or cases at particular stages to particular agents. Historical data may include information such as historical case assignments and outcomes, case "scores" or other case assessments prior to assignment, and other baseline performance measurements. The behavioral pairing module 140 may also search/analyze/process other data sources for information that may be relevant to optimizing assignments and creating artificial intelligence models.

Subsequently, the benchmarking module 180 may measure the gain in performance attributable to the behavioral pairing module 140 as compared to the management assignment module (or other assignment process such as a random or FIFO process). The benchmarking module 180 may process the outcomes of each pairing to determine the relative performance of cases in the optimized group, which were allocated solely using behavioral pairing, against the performance of cases in the control group, which were allocated solely by management. The benchmarking module 180 may output performance measurements 190 or other information regarding the performance of the non-collaborative allocation system 400.

The non-collaborative allocation system 400 may repeat this process as new cases for assignment (e.g., cases for assignment 110) arrive or otherwise become ready to be allocated among the agents. In some embodiments, the management assignment module 120 or the behavioral pairing module 140 may process results from earlier iterations to improve the management process (e.g., train managers regarding certain rationales that were more or less effective than others) or the behavioral pairing process (e.g., train or update the artificial intelligence algorithms or models).

In some embodiments, the non-collaborative allocation system 400 may operate "online" (e.g., in real time) as cases arrive at a queue or as management assignments are made. In other embodiments, the non-collaborative allocation system 400 may operate "offline" (e.g., not in real time), so that a group of cases may be reassigned or otherwise allocated together.

Figure 5:
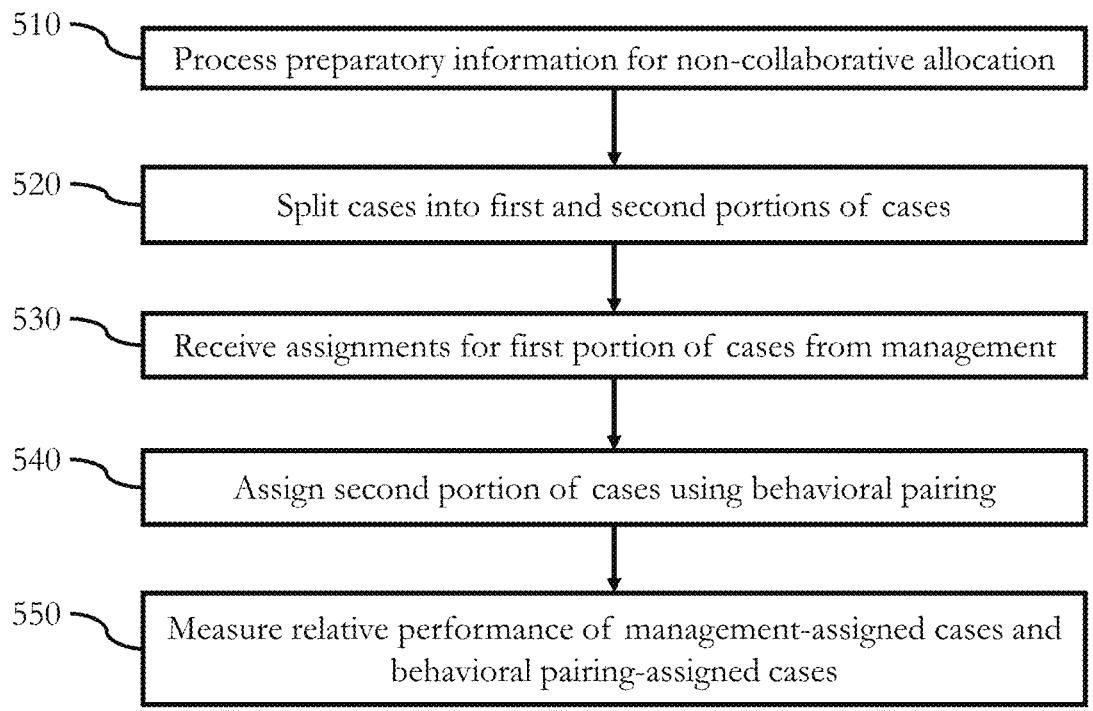
FIG. 5 shows a flow diagram of a non-collaborative allocation method according to embodiments of the present disclosure.

FIG. 5 shows a flow diagram of a non-collaborative allocation method according to embodiments of the present disclosure. At block 510, non-collaborative allocation method 500 may begin.

At block 510, preparatory information for non-collaborative allocation may be processed. For example, an assignment or pairing module (e.g., behavioral pairing module 140) may receive agent survey data, management survey data, historical data, or other information for processing in preparation for assigning or otherwise allocating cases to agents. Non-collaborative allocation method 500 may proceed to block 520.

At block 520, cases may be split into first and second portions of one or more cases. Non-collaborative allocation method 500 may proceed to block 530.

At block 530, assignment data may be received for the portion of cases split out for management assignment (or, e.g., random or FIFO assignment). Non-collaborative allocation method 500 may proceed to block 540.

At block 540, the second portion of cases may be assigned using a pairing strategy such as behavioral pairing (BP). Non-collaborative allocation method 500 may proceed to block 550.

At block 550, the relative performance of BP-assigned cases and management-assigned cases may be benchmarked or otherwise measured. In some embodiments, results from the comparison may be used to improve the pairing module (e.g., artificial intelligence models of behavioral pairing module 140) or the rationales of management for subsequent management assignments, or both.

Following block 550, non-collaborative allocation method 500 may end. In some embodiments, non-collaborative allocation method 500 may return to block 510 to begin allocating additional cases.

At this point it should be noted that collaborative and non-collaborative allocation using behavioral pairing in accordance with the present disclosure as described above may involve the processing of input data and the generation of output data to some extent. This input data processing and output data generation may be implemented in hardware or software. For example, specific electronic components may be employed in a collaborative and non-collaborative allocation module, behavioral pairing module, benchmarking module, and/or similar or related circuitry for implementing the functions associated with collaborative and non-collaborative allocation using behavioral pairing, such as in a workflow management system, contact center system, case management system, etc. in accordance with the present disclosure as described above. Alternatively, one or more processors operating in accordance with instructions may implement the functions associated with collaborative and non-collaborative allocation using behavioral pairing in accordance with the present disclosure as described above. If such is the case, it is within the scope of the present disclosure that such instructions may be stored on one or more non-transitory computer processor readable storage media (e.g., a magnetic disk or other storage medium), or transmitted to one or more computer processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for allocating cases to agents in a service center system comprising:
    receiving, by at least one computer processor communicatively coupled to and configured to operate in the service center system, first assignment data comprising a first pairing of a first case to a first agent;
    analyzing, by the at least one computer processor, the first assignment data for possible reassignment of pairings;
    reassigning, by the at least one computer processor, the first pairing to a second pairing of the first case to a second agent different from the first agent based at least in part on the analyzing and a behavioral pairing strategy; and
    allocating, by the at least one computer processor, the first case to the second agent.

2. The method of claim 1, further comprising:
    recording, by the at least one computer processor, an indicator that the first case was reassigned.

3. The method of claim 1, further comprising:
    determining, by the at least one computer processor, an expected outcome of the first case based on a hypothetical allocation to the first agent;
    determining, by the at least one computer processor, an actual outcome of the first case allocated to the second agent; and
    outputting, by the at least one computer processor, a performance difference between the actual outcome and the expected outcome.

4. The method of claim 1, further comprising:
    receiving, by the at least one computer processor, a first plurality of case allocations that were previously allocated based on the behavioral pairing strategy;
    receiving, by the at least one computer processor, a second plurality of case allocations that were previously allocated based on instructions to reassign; and
    determining, by the at least one computer processor, a difference in performance between the first and second pluralities of case allocations.

5. The method of claim 1, wherein the instruction to reassigning is based on an instruction to reassign received from a management authority.

6. The method of claim 5, further comprising:
    receiving, by the at least one computer processor, a reassignment confidence level for the instruction to reassign.

7. The method of claim 5, further comprising:
    receiving, by the at least one computer processor, a rationale from the management authority for the instruction to reassign.

8. A system for allocating cases to agents in a service center system comprising:
    at least one computer processor communicatively coupled to and configured to operate in the service center system, wherein the at least one computer processor is further configured to:
        receive first assignment data comprising a first pairing of a first case to a first agent;
        analyze the first assignment data for possible reassignment of pairings;
        reassign the first pairing to a second pairing of the first case to a second agent different from the first agent based at least in part on the analyzing and a behavioral pairing strategy; and
        allocate the first case to the second agent.

9. The system of claim 8, wherein the at least one computer processor is further configured to:
    record an indicator that the first case was reassigned.

10. The system of claim 8, wherein the at least one computer processor is further configured to:
    determine an expected outcome of the first case based on a hypothetical allocation to the first agent;
    determine an actual outcome of the first case allocated to the second agent; and
    output a performance difference between the actual outcome and the expected outcome.

11. The system of claim 8, wherein the at least one computer processor is further configured to:
receive a first plurality of case allocations that were previously allocated based on the behavioral pairing strategy;
receive a second plurality of case allocations that were previously allocated based on instructions to reassign; and
determine a difference in performance between the first and second pluralities of case allocations.

12. The system of claim 8, wherein the reassigning is based on an instruction to reassign received from a management authority.

13. The system of claim 12, wherein the at least one computer processor is further configured to:
receive a reassignment confidence level for the instruction to reassign.

14. The system of claim 12, wherein the at least one computer processor is further configured to:
receive a rationale from the management authority for the instruction to reassign.

15. An article of manufacture for allocating cases to agents in a service center system comprising:
a non-transitory computer processor readable medium; and
instructions stored on the medium;
wherein the instructions are configured to be readable from the medium by at least one computer processor communicatively coupled to and configured to operate in the service center system and thereby cause the at least one computer processor to operate so as to:
receive first assignment data comprising a first pairing of a first case to a first agent;
analyze the first assignment data for possible reassignment of pairings;
reassign the first pairing to a second pairing of the first case to a second agent different from the first agent based at least in part on the analyzing and a behavioral pairing strategy; and
allocate the first case to the second agent.

16. The article of manufacture of claim 15, wherein the at least one computer processor is further configured to:
record an indicator that the first case was reassigned.

17. The article of manufacture of claim 15, wherein the at least one computer processor is further configured to:
determine an expected outcome of the first case based on a hypothetical allocation to the first agent;
determine an actual outcome of the first case allocated to the second agent; and
output a performance difference between the actual outcome and the expected outcome.

18. The article of manufacture of claim 15, wherein the at least one computer processor is further configured to:
receive a first plurality of case allocations that were previously allocated based on the behavioral pairing strategy;
receive a second plurality of case allocations that were previously allocated based on instructions to reassign; and
determine a difference in performance between the first and second pluralities of case allocations.

19. The article of manufacture of claim 15, wherein the reassigning is based on an instruction to reassign received from a management authority.

20. The article of manufacture of claim 19, wherein the at least one computer processor is further configured to:
receive a reassignment confidence level for the instruction to reassign.

21. The article of manufacture of claim 19, wherein the at least one computer processor is further configured to:
receive a rationale from the management authority for the instruction to reassign.

* * * * *